United States Patent
Kernick et al.

(10) Patent No.: US 12,014,480 B2
(45) Date of Patent: Jun. 18, 2024

(54) DEFECT DETECTION USING SYNTHETIC DATA AND MACHINE LEARNING

(71) Applicant: Johnson & Johnson Vision Care, Inc., Jacksonville, FL (US)

(72) Inventors: Edward R. Kernick, Jacksonville, FL (US); Peter Cerreta, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 409 days.

(21) Appl. No.: 17/505,181

(22) Filed: Oct. 19, 2021

(65) Prior Publication Data

US 2023/0122214 A1    Apr. 20, 2023

(51) Int. Cl.
G06T 7/00        (2017.01)
G06F 18/21       (2023.01)
G06F 18/214      (2023.01)
G06N 3/04        (2023.01)

(52) U.S. Cl.
CPC .......... *G06T 7/0004* (2013.01); *G06F 18/214* (2023.01); *G06F 18/217* (2023.01); *G06N 3/04* (2013.01); *G06T 2207/20081* (2013.01); *G06T 2207/20084* (2013.01); *G06T 2207/30108* (2013.01)

(58) Field of Classification Search
CPC ......... G06T 7/0004; G06T 2207/20081; G06T 2207/20084; G06T 2207/30108; G06T 11/00; G06T 7/30; G06F 18/214; G06F 18/217; G06N 3/04; G06N 20/00; G01N 21/8851; G01N 21/958; G01N 2021/8858; G01N 2021/8883; G01N 2021/8887; G01N 2021/9583; G01N 2201/1296

USPC .................................................... 356/239.2
See application file for complete search history.

(56) References Cited

U.S. PATENT DOCUMENTS 5,578,331 A * 11/1996 Martin ............... B29D 11/0024
                                                    264/2.6
5,995,213 A * 11/1999 Davis ................. G01M 11/0207
                                                    356/124
6,882,411 B2 * 4/2005 Dispenza ........... G01M 11/0214
                                                    356/124

(Continued)

OTHER PUBLICATIONS

"Extended European Search Report Received for European Patent Application No. 22202121.4", Mailed Date: Mar. 22, 2023., 7 Pages.

(Continued)

*Primary Examiner* — Roy M Punnoose
(74) *Attorney, Agent, or Firm* — Kristina Okafor

(57) ABSTRACT

A method for quality control of contact lens packages comprises receiving a first data set comprising a plurality of images of a contact lens package having physically implanted defects; receiving a second data set comprising a plurality of images of a contact lens package having digitally implanted defects; testing and training, on the first and second data set, a model to determine a validated one or more quality control models; capturing image data of a package of a contact lens; analyzing, based on the validated one or more quality control models, the image data; and causing, based on the analyzing, output of a quality control metric indicative of at least an accept or reject condition of the package.

13 Claims, 18 Drawing Sheets

(56) References Cited

U.S. PATENT DOCUMENTS

| | | | |
|---|---|---|---|
| 2002/0163638 A1* | 11/2002 | Biel | G01M 11/0278 356/239.2 |
| 2009/0303465 A1* | 12/2009 | Clements | G01M 11/0242 356/124 |
| 2012/0327396 A1* | 12/2012 | Sites | G01N 21/8806 356/124 |
| 2023/0065811 A1* | 3/2023 | Edwards | G01M 11/0278 |

OTHER PUBLICATIONS

Khosla, et al., "Enhancing Performance of Deep Learning Models with different Data Augmentation Techniques: A Survey", In International Conference on Intelligent Engineering and Management, pp. 79-85, Jun. 2020.

Lin, et al., "Few-Shot Defect Segmentation Leveraging Abundant Defect-Free Training Samples Through Normal Background Regularization And Crop-And-Paste Operation", In IEEE International Conference on Multimedia and Expo (ICME), pp. 1-6, Jul. 2021.

Zhang, et al., "Weld Defect Detection Based on Deep Learning Method", In IEEE 15th International Conference on Automation Science and Engineering (CASE), pp. 1574-1579, Aug. 2019.

\* cited by examiner

DEFECT DETECTION USING SYNTHETIC DATA AND MACHINE LEARNING

BACKGROUND

Quality control for contact lenses may rely on inspection and detection techniques. However, improvements are needed.

SUMMARY

This disclosure describes systems and methods for quality control of contact lens packages. The method comprises receiving a first data set and a second set of data. The first dataset comprises a plurality of images of a contact lens package having physically implanted foreign matter disposed therein. The second dataset comprises a plurality of images of a contact lens package having digitally implanted foreign matter. The method further comprises training one or more quality control models on at least a training subset of the first data set and the second data set. The one or more quality control models are configured to detect the existence of foreign matter. After the model or models have been trained, the models may be tested on at least a subset of the first data set and the second data set. The training and testing of the quality control models my be repeated until a predetermined performance threshold may be met. After this threshold has been met, the quality control model constitutes a validated model. The method further comprises capturing an image of a contact lens package and analyzing that image based on the validated model or models. Based on this analysis, the method will output a quality control metric indicative of an accept or reject condition of the package.

This disclosure describes a system for quality control of contact lens packages. The system comprises a sensor for capturing image data of a contact lens package. The system further comprises a computing device in communication with the sensor and configured to receive a first set of data and a second set of data. The first data set comprises a plurality of images of a contact lens package having physically implanted foreign matter. The second data set comprises a plurality of images of a contact lens package having digitally implanted foreign matter. The computing device further may comprise a quality control model. The quality control model may be trained on at least a training subset of the first data set and the second data set. The one or more quality control models are configured to detect the existence of foreign matter. After the model or models have been trained, the models may be tested on at least a subset of the first data set and the second data set. The training and testing of the quality control models my be repeated until a predetermined performance threshold may be met. After this threshold has been met, the quality control model constitutes a validated model. The system further comprises capturing an image of a contact lens package by the sensor and analyzing that image based on the validated model or models. Based on this analysis, the system will output a quality control metric indicative of an accept or reject condition of the package. The system may further comprise a conveying mechanism configured to deliver the package within a field of view of the sensor.

This disclosure describes a method for quality control of contact lens packages. The method comprises receiving a first data set and a second set of data. The first dataset comprises a plurality of images of a contact lens package having physically implanted defects disposed therein. The second dataset comprises a plurality of images of a contact lens package having digitally implanted defects. The method further comprises training one or more quality control models on at least a training subset of the first data set and the second data set. The one or more quality control models are configured to detect the existence of defects. After the model or models have been trained, the models may be tested on at least a subset of the first data set and the second data set. The training and testing of the quality control models my be repeated until a predetermined performance threshold may be met. After this threshold has been met, the quality control model constitutes a validated model. The method further comprises capturing an image of a contact lens package and analyzing that image based on the validated model or models. Based on this analysis, the method will output a quality control metric indicative of an accept or reject condition of the package. A defect may comprise one or more of foreign matter, an edge defect, or a hole.

This disclosure describes a system for quality control of contact lens packages. The system comprises a sensor for capturing image data of a contact lens package. The system further comprises a computing device in communication with the sensor and configured to receive a first set of data and a second set of data. The first data set comprises a plurality of images of a contact lens package having physically implanted defects. The second data set comprises a plurality of images of a contact lens package having digitally implanted defects. The computing device further may comprise a quality control model. The quality control model may be trained on at least a training subset of the first data set and the second data set. The one or more quality control models are configured to detect the existence of defects. After the model or models have been trained, the models may be tested on at least a subset of the first data set and the second data set. The training and testing of the quality control models my be repeated until a predetermined performance threshold may be met. After this threshold has been met, the quality control model constitutes a validated model. The system further comprises capturing an image of a contact lens package by the sensor and analyzing that image based on the validated model or models. Based on this analysis, the system will output a quality control metric indicative of an accept or reject condition of the package. The system may further comprise a conveying mechanism configured to deliver the package within a field of view of the sensor. A defect may comprise one or more of foreign matter, an edge defect, or a hole.

This disclosure describes a method for quality control of contact lens packages. The method comprises generating a data set. The data set comprises a plurality of augmented images of a contact lens package having digitally implanted foreign matter. The digitally implanted foreign matter in the plurality of augmented images has characteristics different from other implanted foreign matter. These characteristics comprise morphology, size, location, opacity, and the quantity of foreign matter. The method further comprises training one or more quality control models on at least a training subset of the data set. The one or more quality control models are configured to detect the existence of foreign matter. The method further comprises testing the trained one or more quality control models on at least a validation subset of the data set. The method further comprises capturing an image data of a contact lens package. The method further comprises analyzing, based on the trained and tested one or more quality control models, the image data and causing, based on the analyzing, output of a quality control metric indicative of at least an accept or reject condition of the package.

This disclosure describes a system for quality control of contact lens packages. The system comprises a sensor for capturing image data of a contact lens package. The system further comprises a computing device in communication with the sensor and configured to receive image data and to analyze the image data based on one or more quality control models. The system further comprises generating a data set. The data set comprises a plurality of augmented images of a contact lens package having digitally implanted foreign matter. The digitally implanted foreign matter in the plurality of augmented images has characteristics different from other implanted foreign matter. These characteristics comprise morphology, size, location, opacity, and the quantity of foreign matter. The system further comprises training one or more quality control models on at least a training subset of the data set. The one or more quality control models are configured to detect the existence of foreign matter. The system further comprises testing the trained one or more quality control models on at least a validation subset of the data set. The system further comprises analyzing, based on one or more of the quality control models, the image data and causing, based on the analyzing, output of a quality control metric indicative of at least an accept or reject condition of the package.

This disclosure describes a method for quality control of contact lens packages. The method comprises generating a data set. The data set comprises a plurality of augmented images of a contact lens package having digitally implanted defects. The digitally implanted defects in the plurality of augmented images have characteristics different from other implanted defects. These characteristics comprise morphology, size, location, opacity, and the quantity of the defects. The method further comprises training one or more quality control models on at least a training subset of the data set. The one or more quality control models are configured to detect the existence of defects. The method further comprises testing the trained one or more quality control models on at least a validation subset of the data set. The method further comprises capturing an image data of a contact lens package. The method further comprises analyzing, based on the trained and tested one or more quality control models, the image data and causing, based on the analyzing, output of a quality control metric indicative of at least an accept or reject condition of the package. Defects may comprise foreign matter, edge defects, and holes.

This disclosure describes a system for quality control of contact lens packages. The system comprises a sensor for capturing image data of a contact lens package. The system further comprises a computing device in communication with the sensor and configured to receive image data and to analyze the image data based on one or more quality control models. The computering device further operates on a generated a data set. The data set comprises a plurality of augmented images of a contact lens package having digitally implanted defects. The digitally implanted defects in the plurality of augmented images have characteristics different from other implanted defects. These characteristics comprise morphology, size, location, opacity, and the quantity of defects. The system further comprises training one or more quality control models on at least a training subset of the data set. The one or more quality control models are configured to detect the existence of foreign matter. The system further comprises testing the trained one or more quality control models on at least a validation subset of the data set. The system further comprises analyzing, based on one or more of the quality control models, the image data and causing, based on the analyzing, output of a quality control metric indicative of at least an accept or reject condition of the package. Defects may comprise foreign matter, edge defects, and holes.

BRIEF DESCRIPTION OF THE DRAWINGS

So that the manner in which the above recited features of the present disclosure can be understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and the invention may admit to other equally effective embodiments.

Other features of the present embodiments will be apparent from the Detailed Description that follows.

DETAILED DESCRIPTION

The present disclosure relates to the use of synthetic, hybrid, or augmented data in training of machine learning algorithms for the detection of foreign matter, holes, and edge defects in lenses and lens packages. Lens packages require quality control to ensure that no foreign matter intrudes into the package. The packages also require inspection to identify holes in the package or the lens, as well as edge defects in the lens. The foreign matter may damage the lens or contaminate the lens, both of which are detrimental to satisfying the customer's needs. The packages may be inspected at any stage of the process including before and after the packages are sealed.

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Foreign matter detection/containment may be used to reduce the amount of foreign matter or defects in contact lenses or packaging being shipped to customers. Gross foreign matter (GFM) is identified as having at least one dimension greater than approximately 647 microns (approximately 25 thousandths of an inch (25 mils)). Approximately means within ±10%, or within ±5%.

Figure 1:
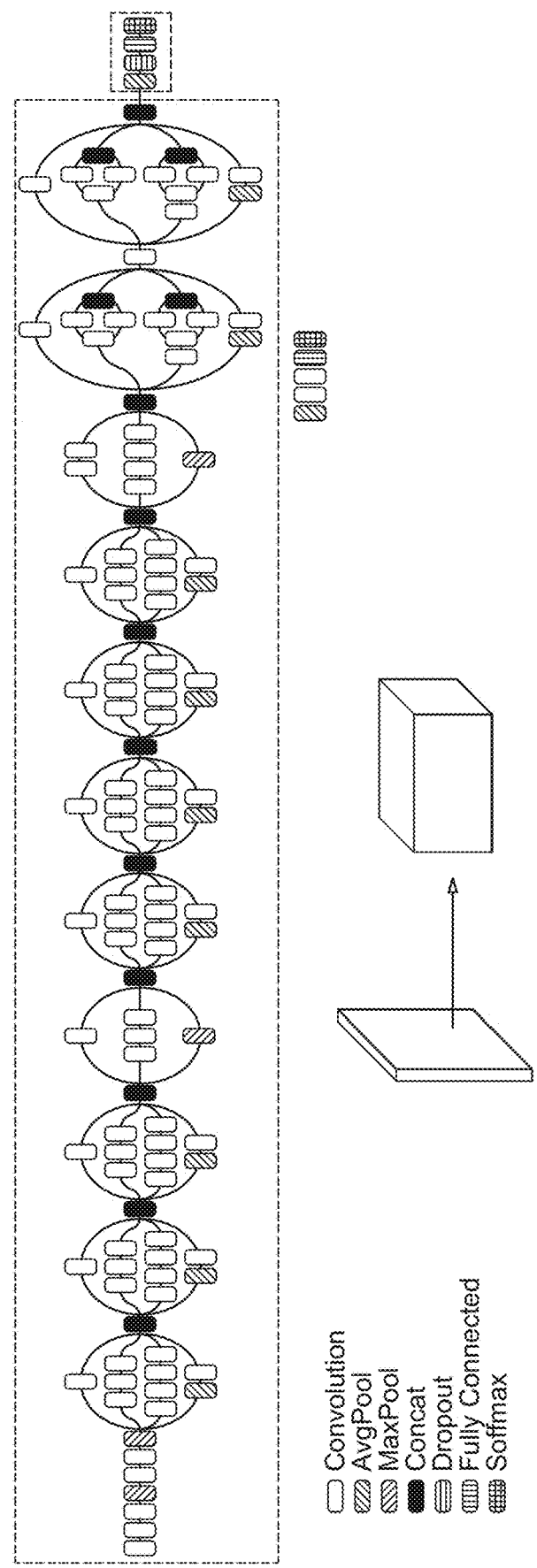
FIG. 1 illustrates an example convolutional neural network (CNN).
Figure 2:
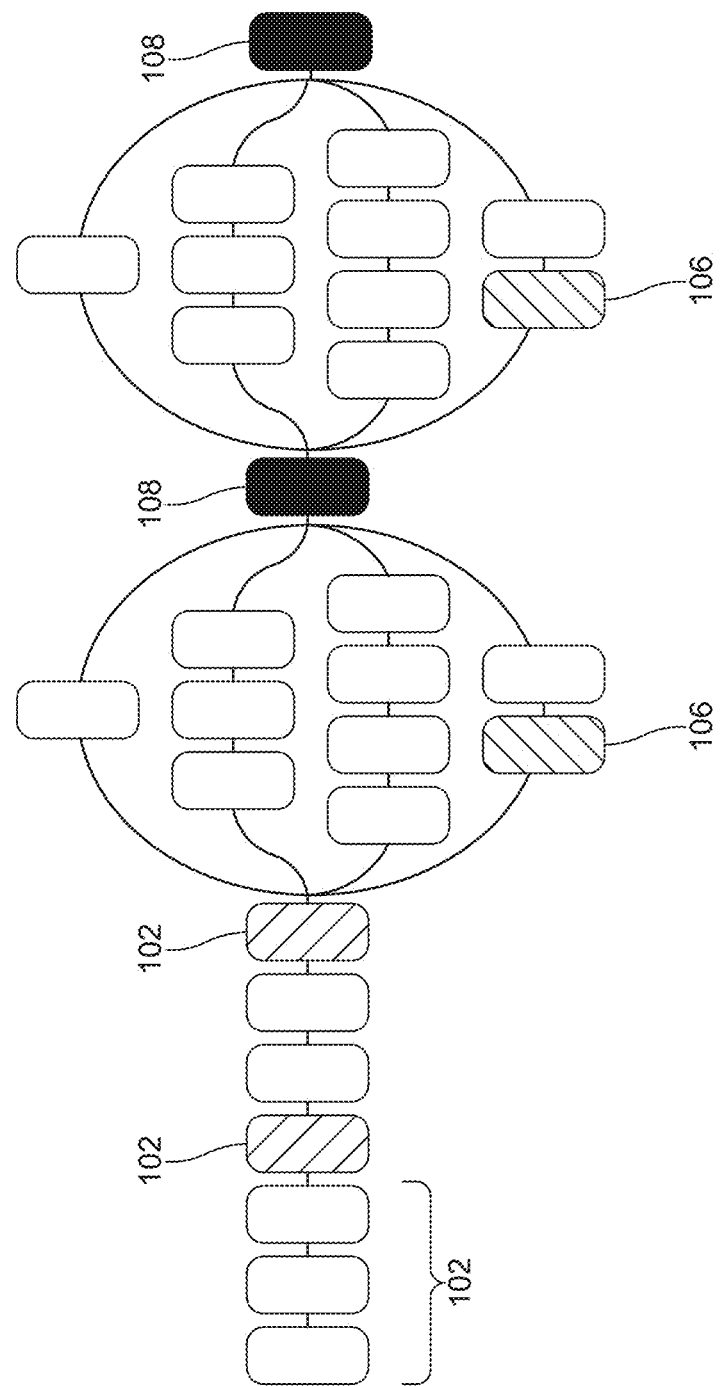
FIG. 2 illustrates a section of the CNN of FIG. 1.

FIGS. 1-3c illustrate an example of a Convolutional Neural Network image classification system. FIG. 1 illustrates the CNN Inception V3 with an input of a color image of 299×299 pixels with a depth of 3 colors. The output is a classification which is 8×8 with a depth of 2048. FIG. 2 illustrates the first several layers of the network. The first three layers of this network include three convolutional layers 102 followed by a maxpooling layer 104. At various stages in the network average pooling layers 106 are implayed as are concatenation layers 108. Most of the layers in this network are convolution layers 102, but only the first three are labelled as such to avoid confusion in labelling. FIG. 3a shows the last several layers of this network. The last layers include mostly convolution layers 102 (again a single one is labelled to avoid confusion), average pooling layers 106, concatenation layers 108, a dropout layer 110, a fully connected layer 112, and a softmax layer 114.

Figure 3A:
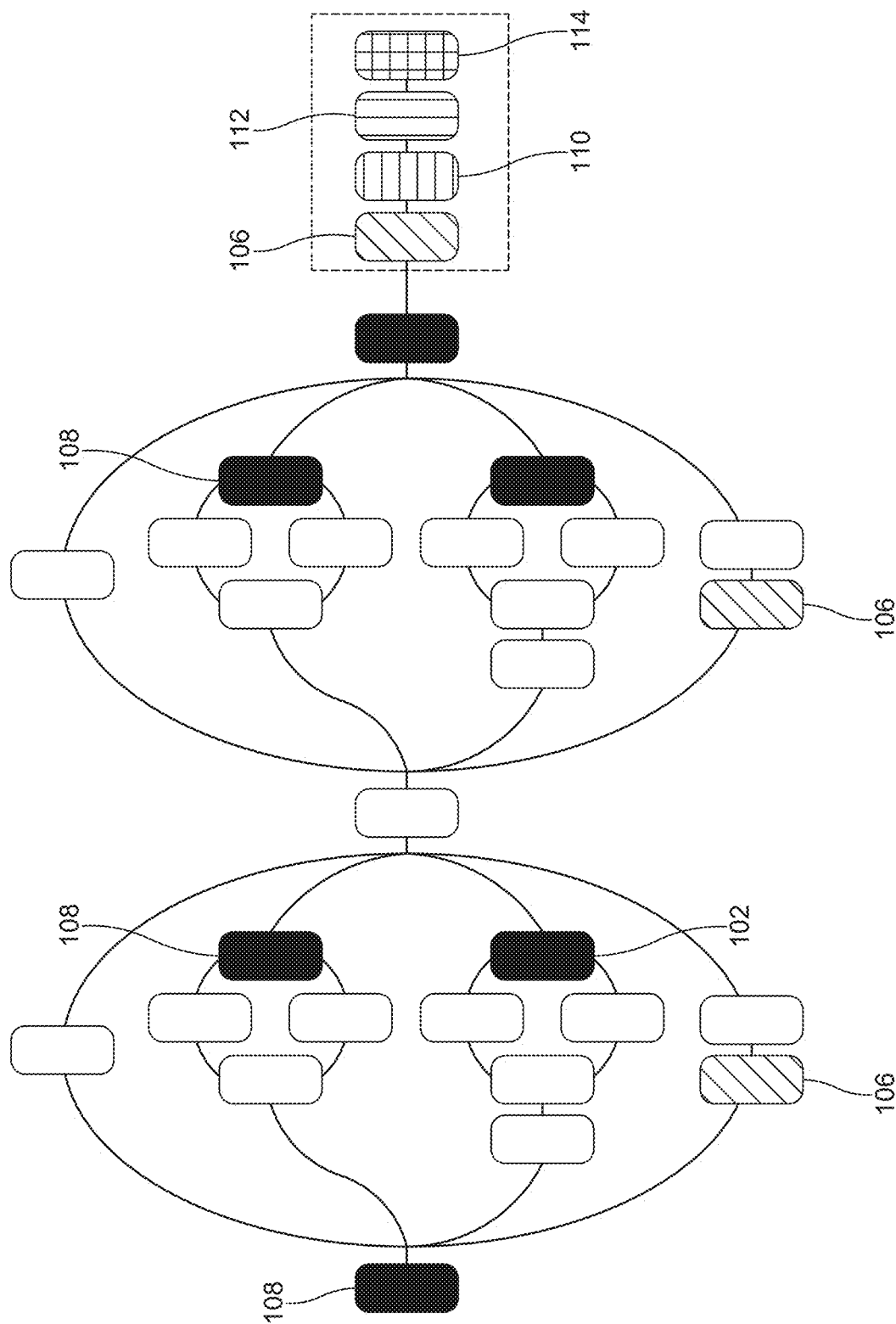
FIG. 3a illustrates a section of the CNN of FIG. 1.
Figure 3B:
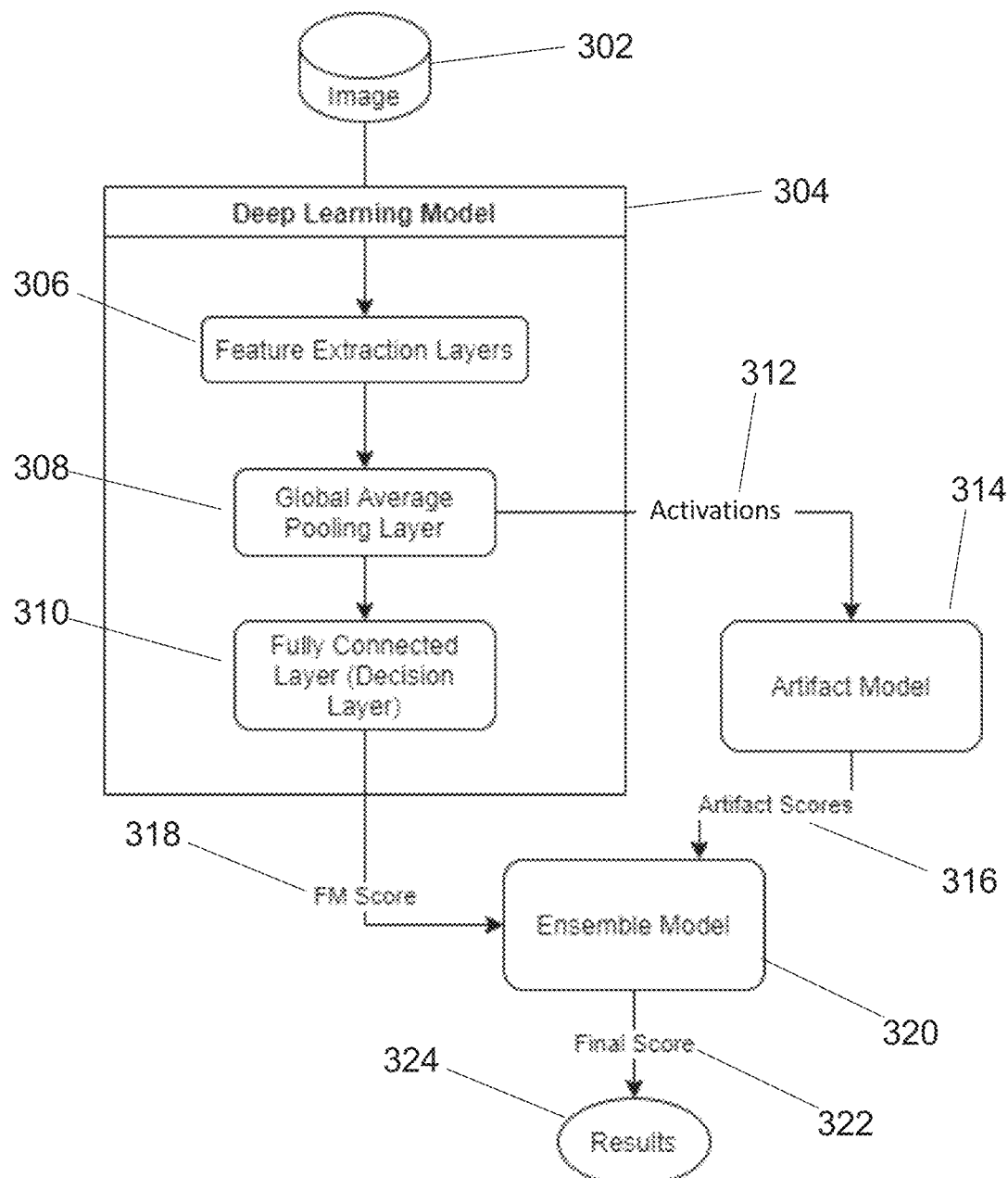
FIG. 3b illustrates a deep learning model.

FIG. 3b illustrates an overview of the ensemble for how the method works. An image 302 is sent into the deep learning model 304. Within the deep learning model 304 there may be a feature extraction layer 306, a global average pooling layer 308, and a fully connected layer 310 (also known as a decision layer). The deep learning model may output an activation 312 and a FM (foreign matter) score 318. The activations 312 may be in the inputs to an artifact model 314, which may output an artifact score 316. The FM score 318 and the artifact score 316 may be inputs to an ensemble model 320. The ensemble model 320 may output a final score 322 which will produce a result 324.

Figure 3C:
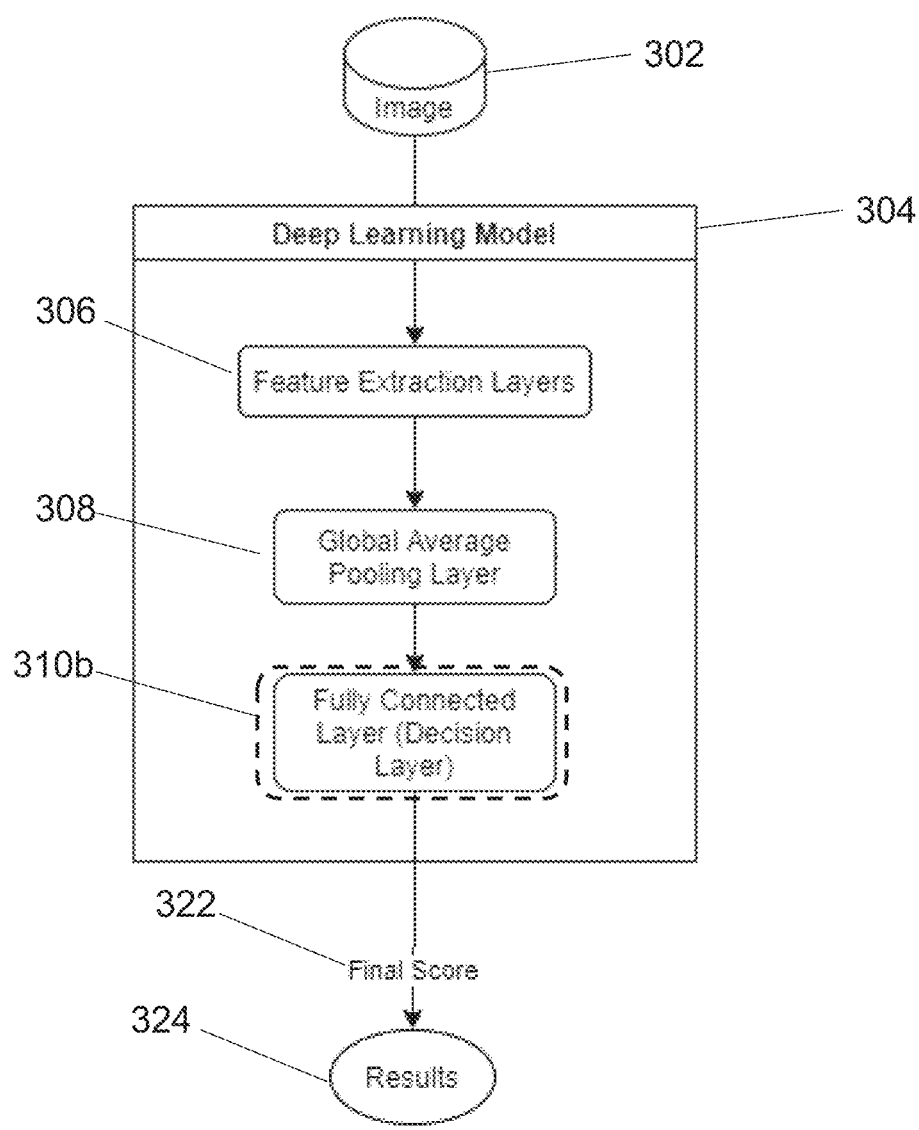
FIG. 3c illustrates a deep learning model.

FIG. 3c illustrates removal of the separate artifact model 314 and the ensemble model 320. A retrained fully connected layer 310b at the end of the deep learning model 304 will enable the final score 322 and the results 324 to be the same as with the old fully connected layer 310, the artifact model 304 and the ensemble model 320. Because no new information is being added by the artifact model 314 that was not already originally present in the deep learning model 304, the deep learning model 304 can have the original fully connected layer 310 be re-trained as a new fully connected layer 310b. Re-training may comprise varying the weights of the components to determine the final score 322 and results 324 directly. In an example, the outputs from the previous method including the artifact model 314 and the ensemble model 320 may be incorporated as an initial re-training step. Other methods of re-training may also be used, as are well known to those skilled in the art of machine learning. The old fully connected layer 310 must be re-trained as the new fully connected layer 310b to tune the decision boundaries of the deep learning model without adjusting any of the feature extraction parameters. Re-training the fully connected layer 310 thus removes the requirement to have these other models and effectively internalizes their results. Note that the FM score 318 and the artifact score 316, as interim calculations, are no longer needed and so are removed from the flow of calculations. Any activations which would have come from the global average pooling layer 308, are now incorporated into the new fully connected layer 310b. Thus the activations 312 also become an interim variable and do not require being sent to another external model. Thus achieving the final score 322 is made by a more direct and simpler calculation which saves processing time and removes the additional complexity of these other models.b A machine learning algorithm such as a convolutional neural network (CNN) may be useful in the classification of images into various categories. As shown in the example in FIGS. 1-4, these networks contain many layers. The network designed may require more of fewer of certain layers and more of fewer of other layers, depending on the precise application. AlexNet and Inception Net V3 are example CNNs which receive as input images of various objects (e.g. a ship, a leopard, a cherry, etc) and output the classification to which the image may belong. As an example, in order to correctly identify or classify such an image, the CNN may first be trained using other images with known classifications. One problem, as it relates to foreign matter intruding into lens packages (or other defects in the packages) is that the rate of foreign matter is quite small (e.g., below 0.4 ppm). Given that FM may be exceptionally rare given other safeguards in the manufacturing process, obtaining even a single package with FM or other defects could require millions of lens packages on average. As an illustration, a desirable number of such images for training purposes may exceed 1000. If so many images were acquired from the physical realm, it may require the production of billions of lens packages, without using the quality control image processing already in place. As such, the present disclosure may address one or more shortcomings without the requirement of such large production analysis to obtain satisfactory testing or training data.

Images with foreign matter may be identified manually (by human identification). Packages containing foreign matter may also be created or seeded and fed into the system for identification; however, such tests require more human effort and time and reduce the capacity of the system to produce defect-free product for customers. Even the manually created defective packages may also not mimic properly the types of defects which are introduced, making the task even more difficult. Towards this end, synthetic data or augmented data may created to help train the ML model for identification or classification of lens packages with real FM.

Figure 4:
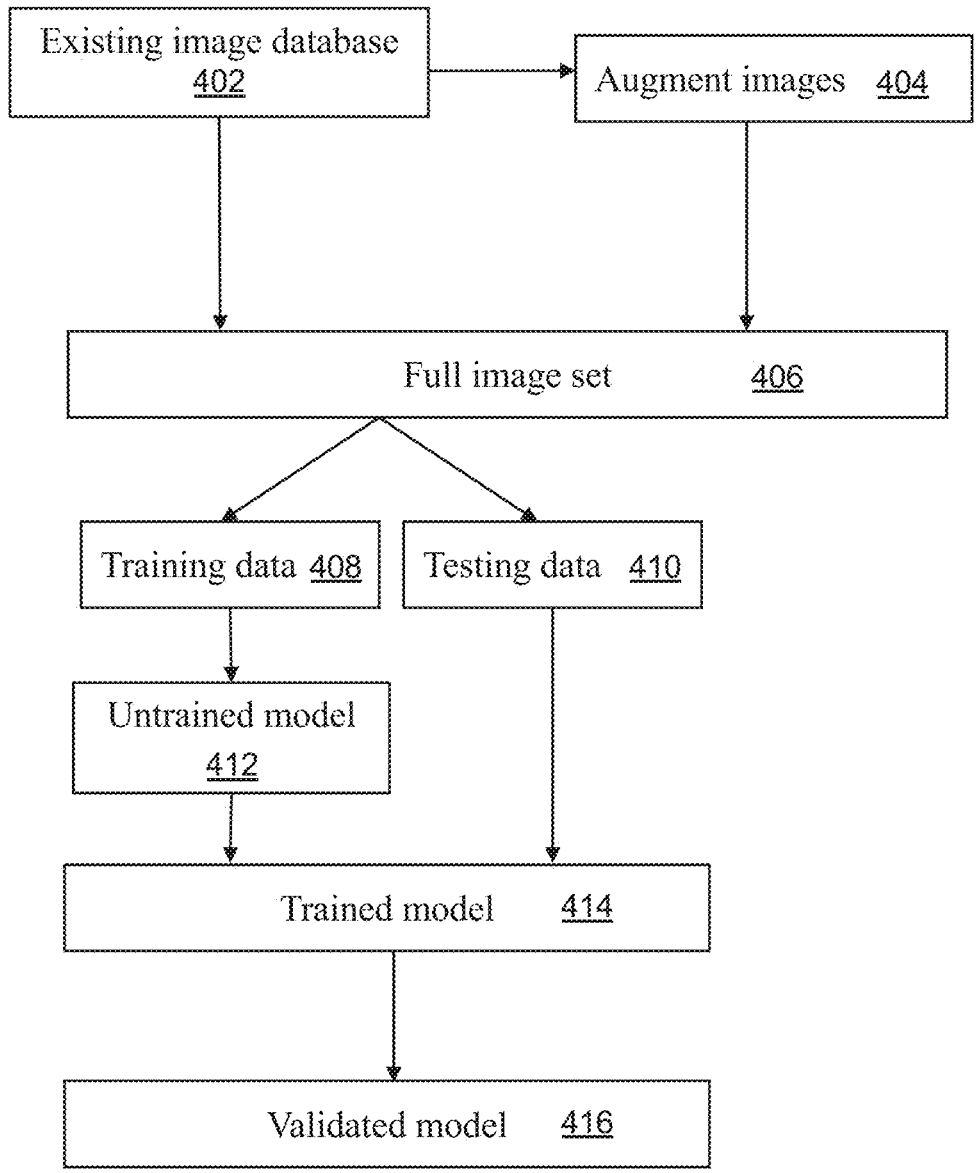
FIG. 4 illustrates training, testing, and validating a model with augmented images.
Figure 5:
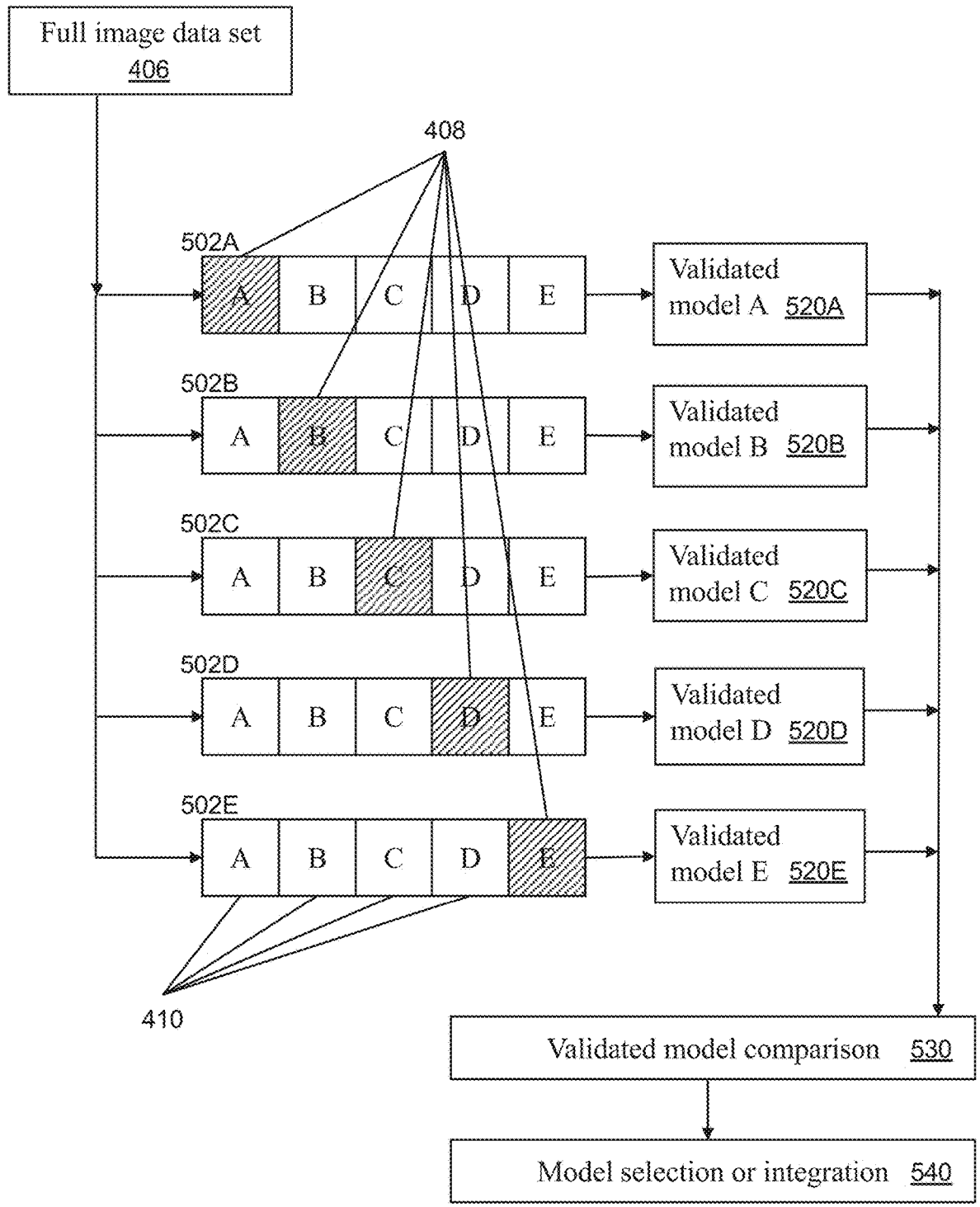
FIG. 5 illustrates cross-validation of a model.

FIGS. 4-5 illustrate training and testing a CNN. As shown for illustration, an existing image database 402 of packages contains images of good packages and also images of bad packages—those with FM, edge defects, holes, and the like. The existing image database 402 contains many more images of good lens packages than bad ones. Augmented images 404 are created from the existing image database 402. The process of creating these augmented images 404 is explained in further detail below and in FIGS. 12-16. The existing image database 402 and the augmented images 404 are combined to form a full image set 406. The full image set 406 may be split into two sets of data: a set of training data 408 and a set of testing data 410. The training data 408 is fed into the untrained model 412 (for instance, the Inception V3 CNN described above) to create a trained model 414. The trained model adjusts the model weighting parameters in the various layers as necessary to obtain the known-correct result for as many images as possible. The testing data 410 are then fed into the trained model 414 to created a validated model 416. The validated model 416 will produce classifications of the testing data 410 for comparison with the known classifications of the testing data 410. If the validated model 416 produces the desired output, in terms of meeting or exceeding a threshold, then the validated model 416 is then ready for use in a production setting. If the validated model 416 does not meet the threshold, then the hyperparameters of the model may be changed or another model may be chosen until a model is found which meets the threshold for acceptable validation. Other techniques may be used.

FIG. 5 illustrates the concept of cross-validation, which is another method for producing a validated model 416, also known as a tested model. In cross-validation, the full image data set 406 is split into several groups. In the example depicted in FIG. 5 the full image data set 406 is split into five groups, labelled A, B, C, D, and E. For each iteration of the cross-validation testing, one of the groups is the training data 408. The remaining groups are the testing or validation data 410. For clarity, the training data 408 is labelled in each iteration of the cross-validation, but only a single set of testing data 410 is labelled in FIG. 5—the ones for iteration 502E. Each of these iterations 502 is labelled based on which group is the training data 408. Thus iteration 502A has training data 408 group A and iteration 502B has training data 408 group B, etc. Each of these iterations produces a validated model 520A, 520B, 520C, 520D, and 520E in the figure. These models are compared 530 and one model is selected or the models are integrated 540 to create the model used for subsequent identification of the lens packages with FM or defects. As noted above there may be a metric or predetermined performance threshold which the validated model(s) 520 must exceed in order to be selected.

Figure 6:
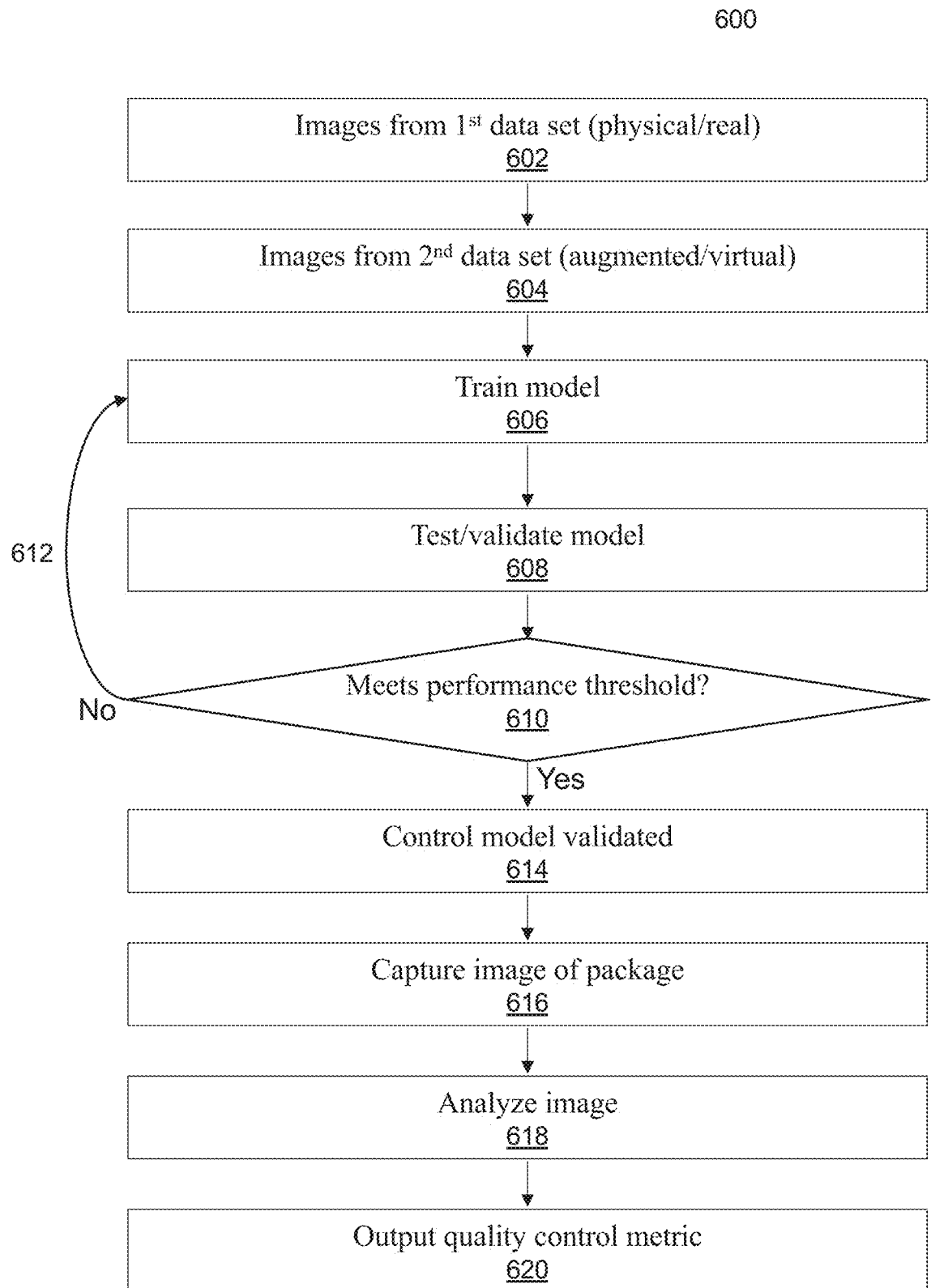
FIG. 6 illustrates a method flow.

FIG. 6 illustrates a method for outputting a quality control metric for lens packages 600. At step 602, images of real lens packages are gathered to form a first data set. At step 604, images are created by digitally implanting defects or FM in images of real lens packages to create a second data set. Thus augmented images are created to increase the number of less commonly occurring images of FM, edge defects, and holes. At step 606 the model is trained using a training data set 408. At step 608 the model is validated using a testing or validation data set 410. Cross-validation (FIG. 2) may also be used. At step 610 the model results are compared with a performance threshold. If the model does not meet the performance threshold then at step 612, the model may be sent back to be tuned and re-trained 606 and re-tested 608. Alternatively hyperparameters of the existing model may be modified and the new model trained. Similarly, an alternative model may be chosen at this stage. The process of tuning a model 612, training a model 606, and testing a model 608—may be repeated until a model meets a performance threshold. Once the model meets the performance threshold, the model has been validated 614. At step 616, an image of a package is captured. At step 618, the validated model analyzes the image. At step 620 a quality control metric is output from the model. For instance, a quality control metric of the model may comprise "pass" or "no foreign matter detected" or "foreign matter detected."

Figure 7:
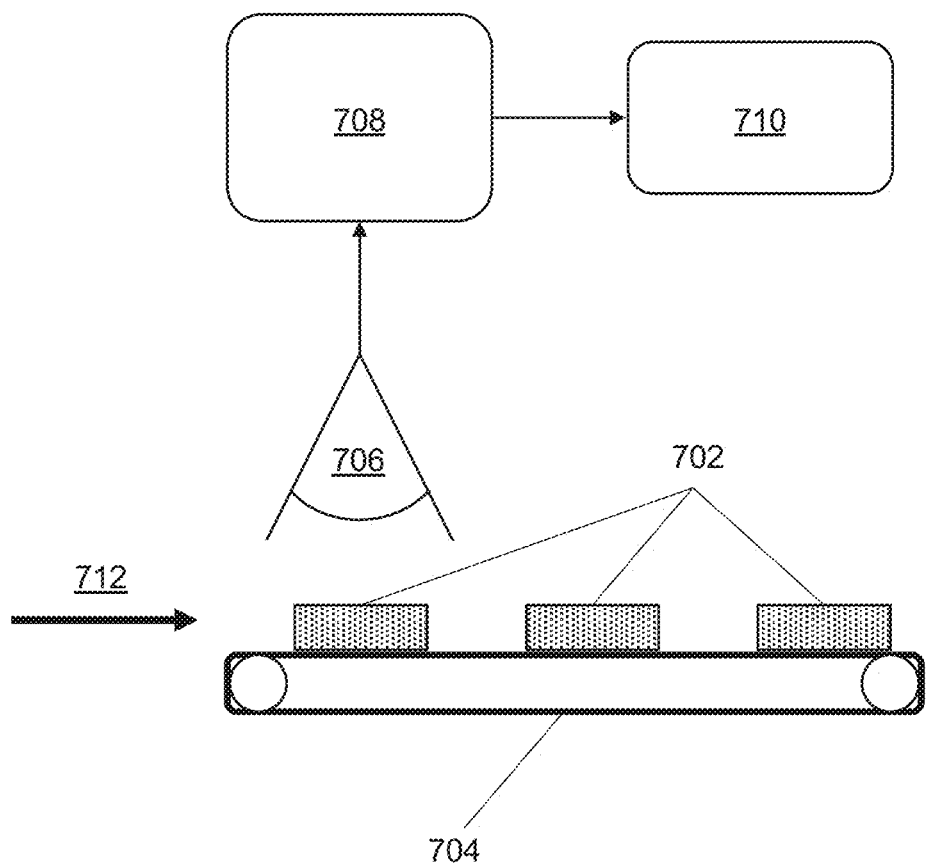
FIG. 7 illustrates a system.

FIG. 7 illustrates a system integrated as part of a production line. Lens packages 702 may rest on a conveyor belt 704, which moves them along a direction of motion 712. The packages are brought into the field of view of a sensor 706. The sensor 706 takes an image of the package 702. A computer 708 is configured to receive an image from the sensor 706. The computer 708 is further configured to analyze the image using a trained model. The computer 708 then outputs a quality control metric 710. The lens package may be moved out of the sensor 706 field of view for further processing which may be influenced by the quality control metric 710. In an example, if the quality control metric output for a particular package 702 is "contains foreign matter" then that package 702 may be isolated at the next step. In an example, if the quality control metric output for a particular package 702 is "defect free" then that package 702 may continue down the production line for shipment.

Figure 8:
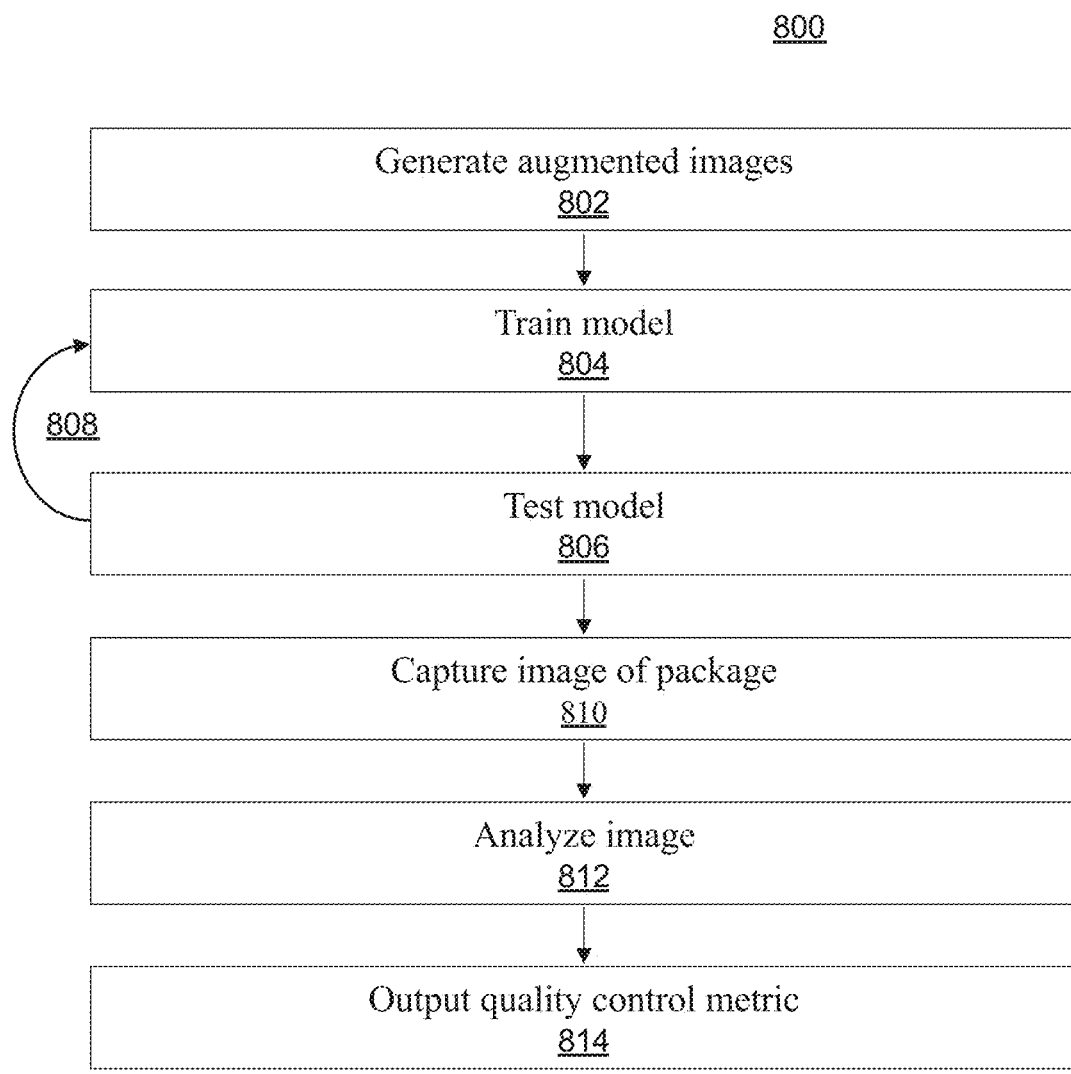
FIG. 8 illustrates a method flow.

FIG. 8 illustrates a process flow 800. At step 802, augmented images are generated. At step 804, a model is trained. At step 806, the model is tested. At step 808 the model may be tuned, re-trained 804, and re-tested 806. This tuning, re-training, and re-testing may occur several times, as needed, or a new model may be selected followed by initial training 804 and testing 806. At step 810 an image of a package is captured. At step 812, the image is analyzed and at step 814, a quality control metric is output.

Figure 9:
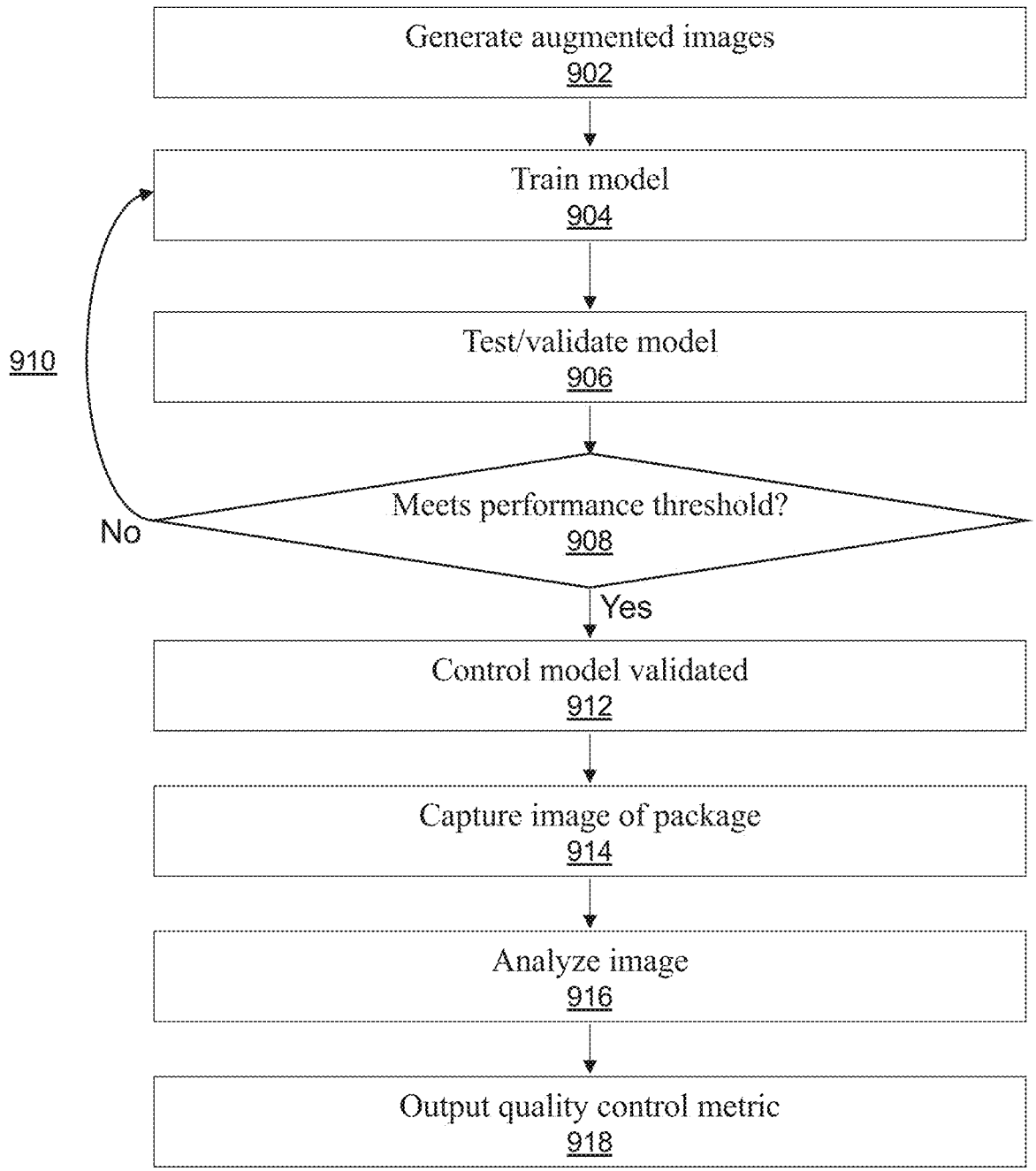
FIG. 9 illustrates a method flow.

FIG. 9 illustrates a process flow 900. At step 902, augmented images may be generated. At step 904, a model may be trained. At step 906, a model may be tested or validated. At step 908, the model may be evaluated to meet a performance threshold. If the model does not meet the performance threshold, then at step 910 the model may be tuned and go back to step 904 training. Alternatively a new model may be selected. Alternatively the model's hyperparameters may be modified or tuned. The tuning, testing, and validating steps may be iterated many times before the model meets the performance threshold. An example of a performance threshold may be identifying FM intrusion with greater than 95% accuracy. Further details of an example performance threshold is discussed further below. Once the model has met the performance threshold it becomes, at step 912, a validated control model. At step 914, an image of a package is captured. At step 916, the image is analyzed by the validated model. At step 918, a quality control metric is output based on the analysis of the validated model.

A performance threshold may comprise the area under the received characteristic curve (AUC) or by the receiver operating characteristic (ROC) curve itself. The ROC is a plot of the true positive rate as a function of the false positive rate. The AUC is an integral of the ROC curve. An alternative performance threshold may require a certain percentage of true positive identifications, or a certain percentage of true negative identifications. Similarly other possible performance thresholds may be imagined. Another alternative threshold is to incorporate all four options of true positive (FM or defect present), true negative (no FM or defect present), false positive (FM/defect incorrectly identified as present), and false negative (FM/defect incorrectly identified as not present). If more classifications are included in the model training (e.g. output include identification of defect or foreign matter and either is present or absent) then other options for a performance threshold become available as well. Similarly if identification of more defects (e.g. edge defect vs. hole) are used in addition to classification of FM present or absent. Other performance thresholds may also be employed, such as achieving a FM true positive rate above a certain percentage (e.g. 99.9%) or low false negative rate (e.g. below 1%). Another possibility is that the true positive rate must be greater than a certain value when the false positive rate is above another value (e.g. true positive must be >0.95 when false positive is >0.5). Other options for a performance threshold such as the Brier score may also be used.

In an example, Inception V3 is used as the CNN (an existing research convolutional neural network). This CNN has an input image size up to 299 pixels by 299 pixels in size (and with 3 colors). For a 15 mm diameter contact lens, this resolution means that a single pixel corresponds to roughly a 60-70 μm wide region in the package.

Figure 10:
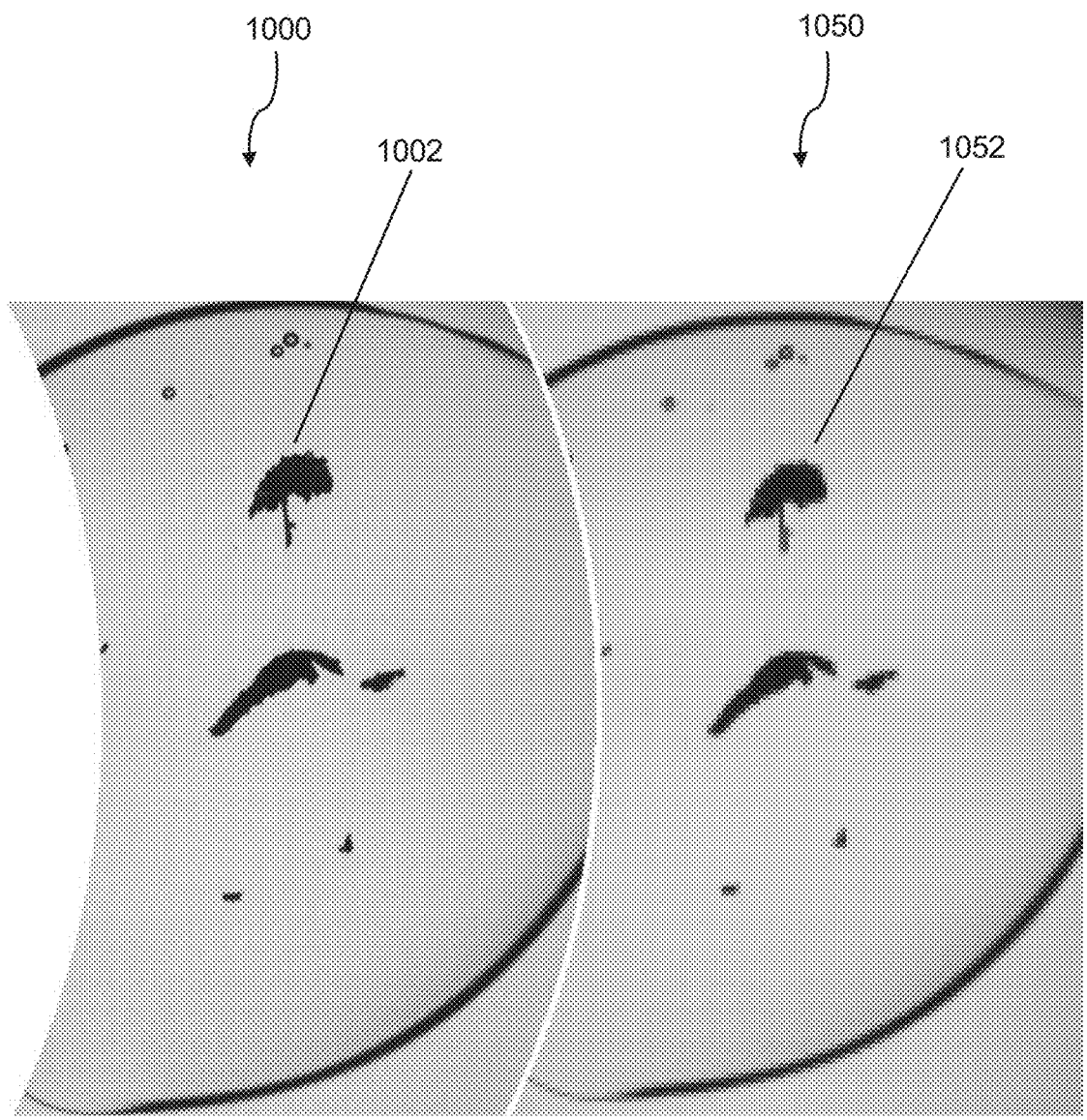
FIG. 10 illustrates image resolution.
Figure 11:
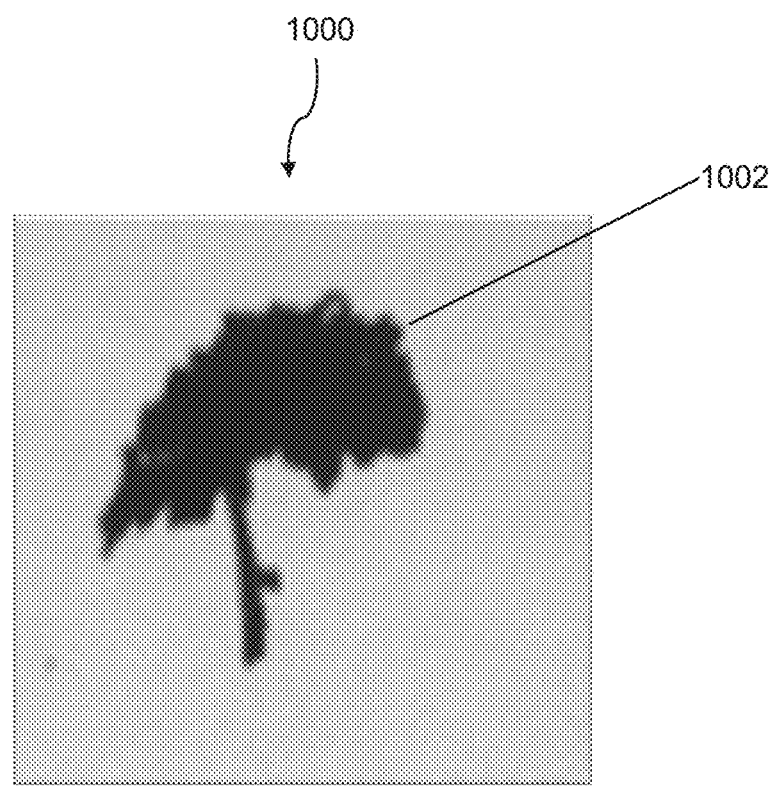
FIG. 11 illustrates one piece of foreign matter in low and high resolution.
Figure 11:
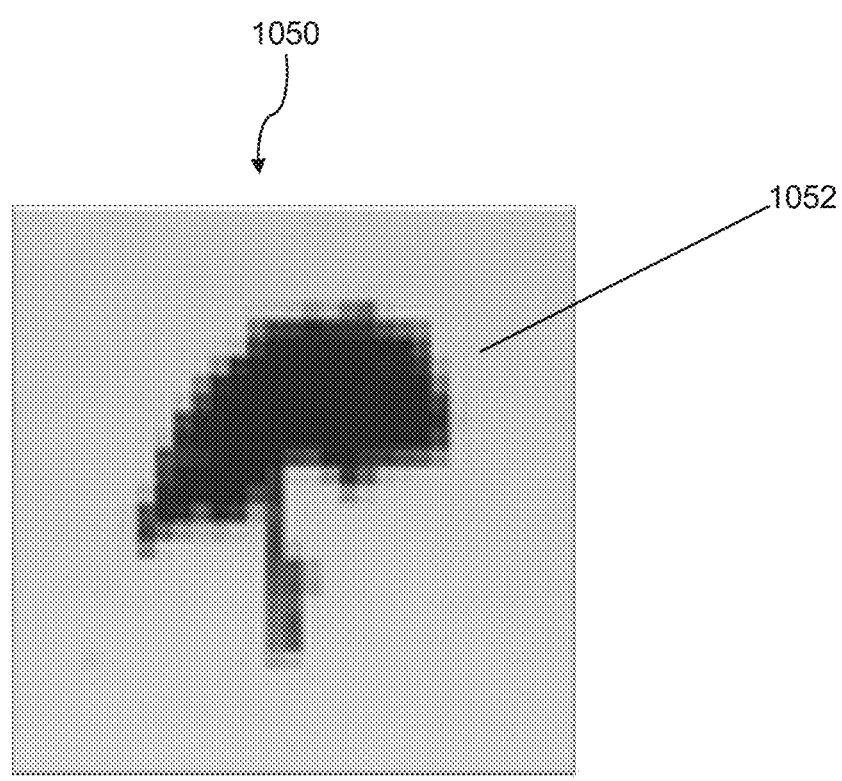
Figure 12:
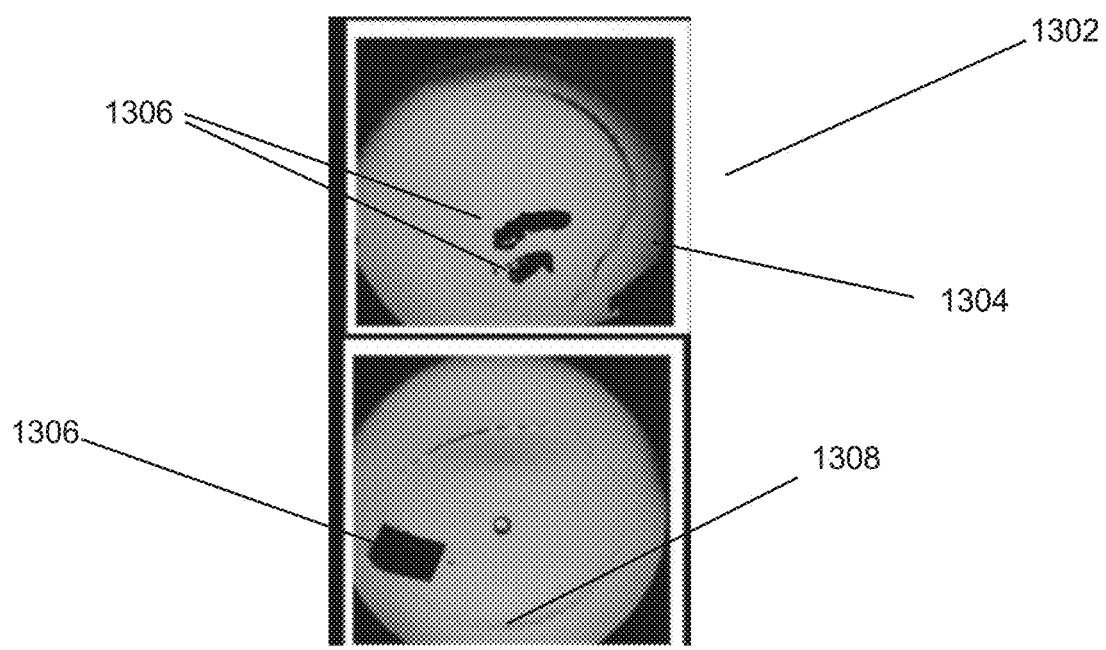
FIG. 12 illustrates physically implanted foreign matter in a lens package.

FIGS. 10 and 11 show images taken at a lower resolution (299×299 pixels) and at a higher resolution (1000×1000 pixels or 2000×2000 pixels). A low resolution image 1050 is compared with the same lens package with a high resolution image 1000. One piece of foreign matter is shown in low resolution 1052 and in high resolution 1002. In FIG. 11 a close up of the foreign matter is shown again in low resolution 1052 and in high resolution 1002. As noted above with the full image size of 299 pixels by 299 pixels, each pixel in the low resolution image 1050 represents 60-70 μm. The FM shown in FIG. 11 is approximately 20 pixels at its greatest dimension or 1200-1400 μm. The higher resolution image 1002 shows the foreign matter in much greater detail. When the resolution increased to 1000 pixels by 1000 pixels the resolved size per pixel improved to ~20 μm/pixel. When the resolution increased to 2000 pixels by 2000 pixels the resolved size per pixel improved to 10 μm per pixel.

One trade off occurs when using a computer model to analyze images of higher resolution is that the image quality improves, but so does the requirement for more computing resources. If the number of weights in the neural network (or other model) increases as the square of the number of pixels, then increasing from 300×300 pixels (9e4 pixels) to 2000× 2000 pixels (4e6) means that the number of operations increases by a factor of more than 1600. With larger image sizes (higher resolutions) the time to analyze an image increases unless faster computer processors are used or more memory is added or other improvements to the computer are implemented (e.g. parallel processing or using specialized processes such as graphics processing units). An illustrative example of this trade off is shown in FIG. 18, which plots the top 10 accuracy (% accurate classification of 10 images) as a function of the number of computer operations for various neural network image categorizers. Some of the models listed are more efficient than others.

Any categorization model must trade off the size of the inputs with the computer resources involved and also the number of parameters to be optimized and the risks of overfitting. In some circumstances decreasing image resolution may improve model performance, but in other circumstances it may eliminate information useful for classification. In general there is a trade-off when CNNs use graphic processing units (GPUs) because GPUs may have memory limitations so that higher image resolutions reduce the maximum batch size the GPU can process. Larger batch size may improve calculation of the gradient with respect to the loss function. In the tests run for this application (classifying lens package images for presence of foreign matter, defects, or holes), the increase in resolution improved model performance significantly.

There are many methods for manipulating images digitally so as to mimic defects. Such methods include partial cropping and shifted the cropped image around or rotating it. The image of a defect may be shifted around or rotated anywhere within the frame. For instance, the image may be cropped at 50% of the fully available image area, and then shifted a random number of pixels up or down or random Δx and random Δy and also rotated by some random angle AO, before being pasted into a blank background or onto another image. The other image may be a known good (defect-free or FM-free) image. Other image manipulation techniques may include creating mirror images of known data—flipping horizontally or vertically—or rotating the images from no rotation to any rotation. The methods may also include regions distorted by other means, such as localized distortions of defects. In general these augmentations may include geometric transformations, random erasures within the original image, and mixing images together. These methods may also be known as hybrid (mixing known good images with known FM-containing images or known defect-containing images), augmented images, or synthetic images.

The method may include augmenting or editing a known good image to include or add pixels with different colors (for color images (e.g. RGB, CIEL*a*b* or other color space schemes) or different grayscale brightnesses, as the case may be) in a form similar to a known FM intrusion in a lens package or the known presence of a hole or edge defect. Other color transformations and filters may be employed as part of the data augmentation. Yet other techniques include adding noise to the image, such as Gaussian noise or salt and pepper noise to random pixels within the image. Yet another technique may comprise enhancing contrast within an image or subtracting an image's mean intensity from each pixel within the image.

Ideally the resulting model may be invariant to translation, rotation, viewpoint, size, of a defect and also invariant to illumination conditions. While a machine implementing this method may be able to control several of these variables (e.g. illumination and orientation or viewpoint), others (size, rotation, and location of the defect) are not under the user's direct control.

Figure 14:
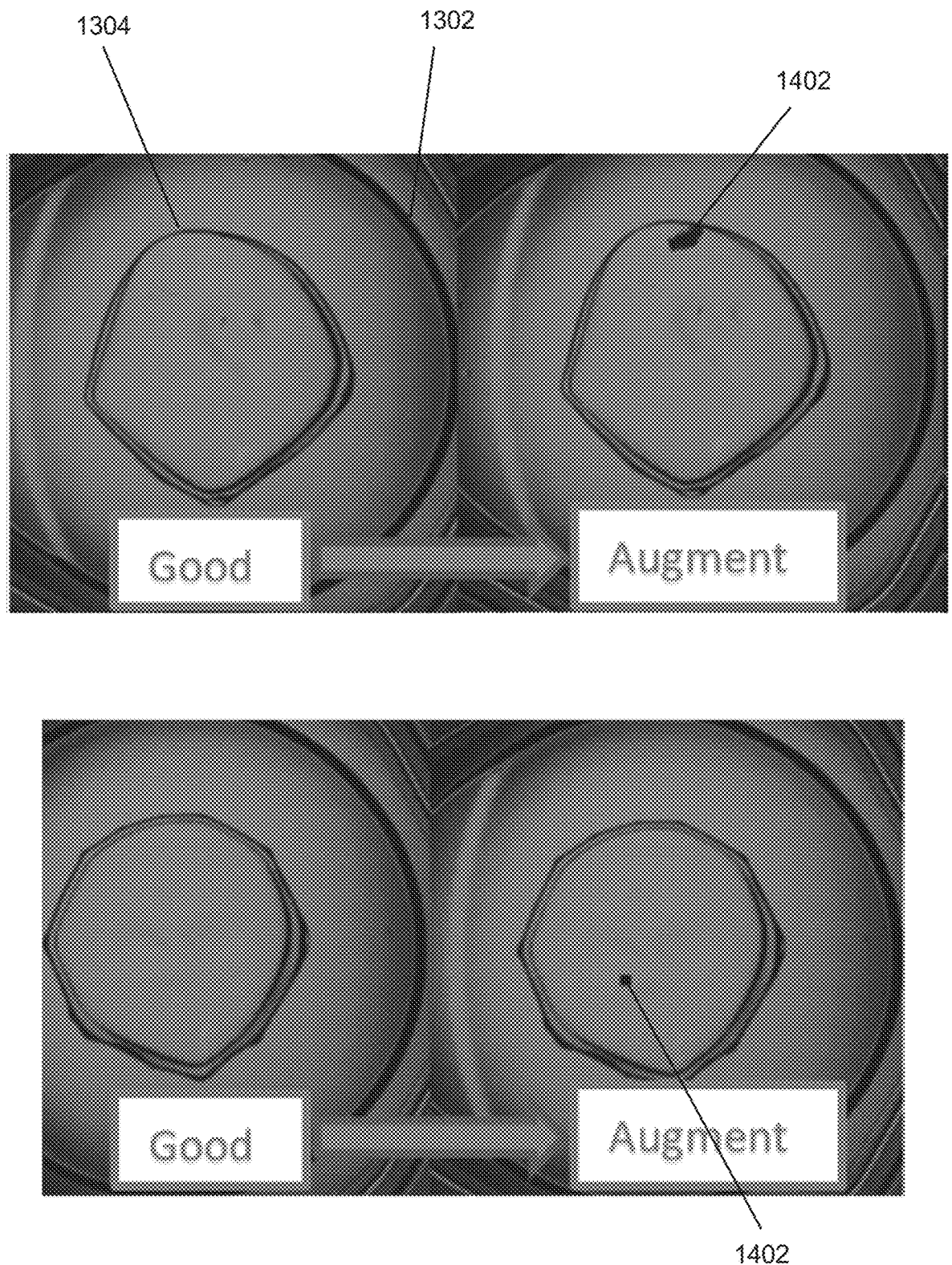
FIG. 14 illustrates augmenting an image with foreign matter.

FIG. 14 illustrates some physically implanted FM into lens packages. The lens package contains a lens 1302. The package also may contain liquid to maintain a sterile environment for the lens. This liquid may appear in the image as a line 1304. There may be a bubble 1308 in the liquid contained within the package. Fully opaque foreign matter 1306 may appear in the image. Partially opaque or outlined foreign matter may also be present. In addition small dots may appear in the image, but they may be below a size threshold (e.g. 150 μm) and may not therefore be considered FM.

Figure 13:
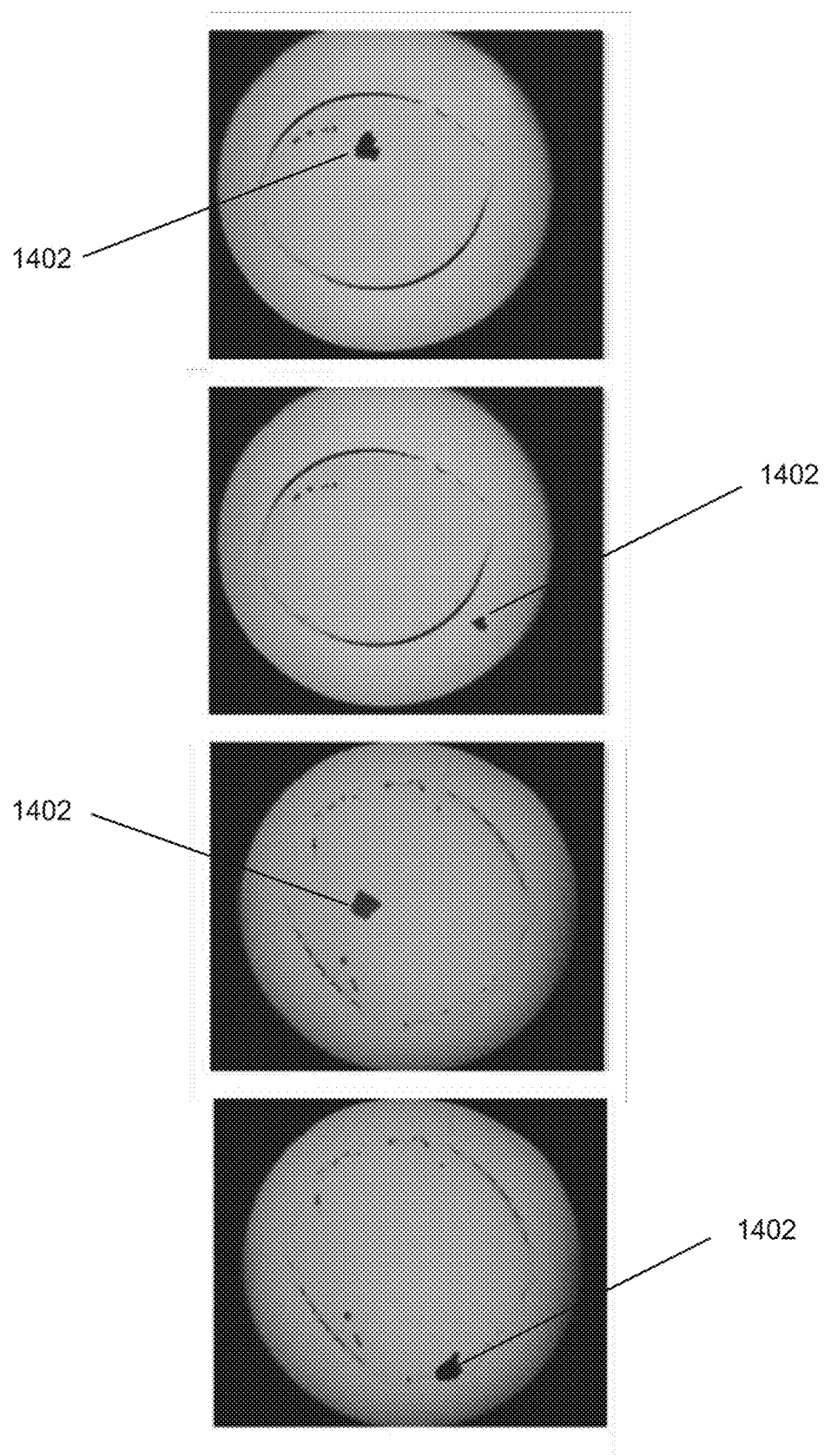
FIG. 13 illustrates digitally implanted foreign matter in a lens package.

FIG. 13 illustrates augmented images. An image without FM is taken and pixels are modified to create an image similar to FM. These augmented images may include digitally implanted foreign matter 1402 in different locations or of different sizes in an image taken which previously contained no foreign matter.

Figure 15:
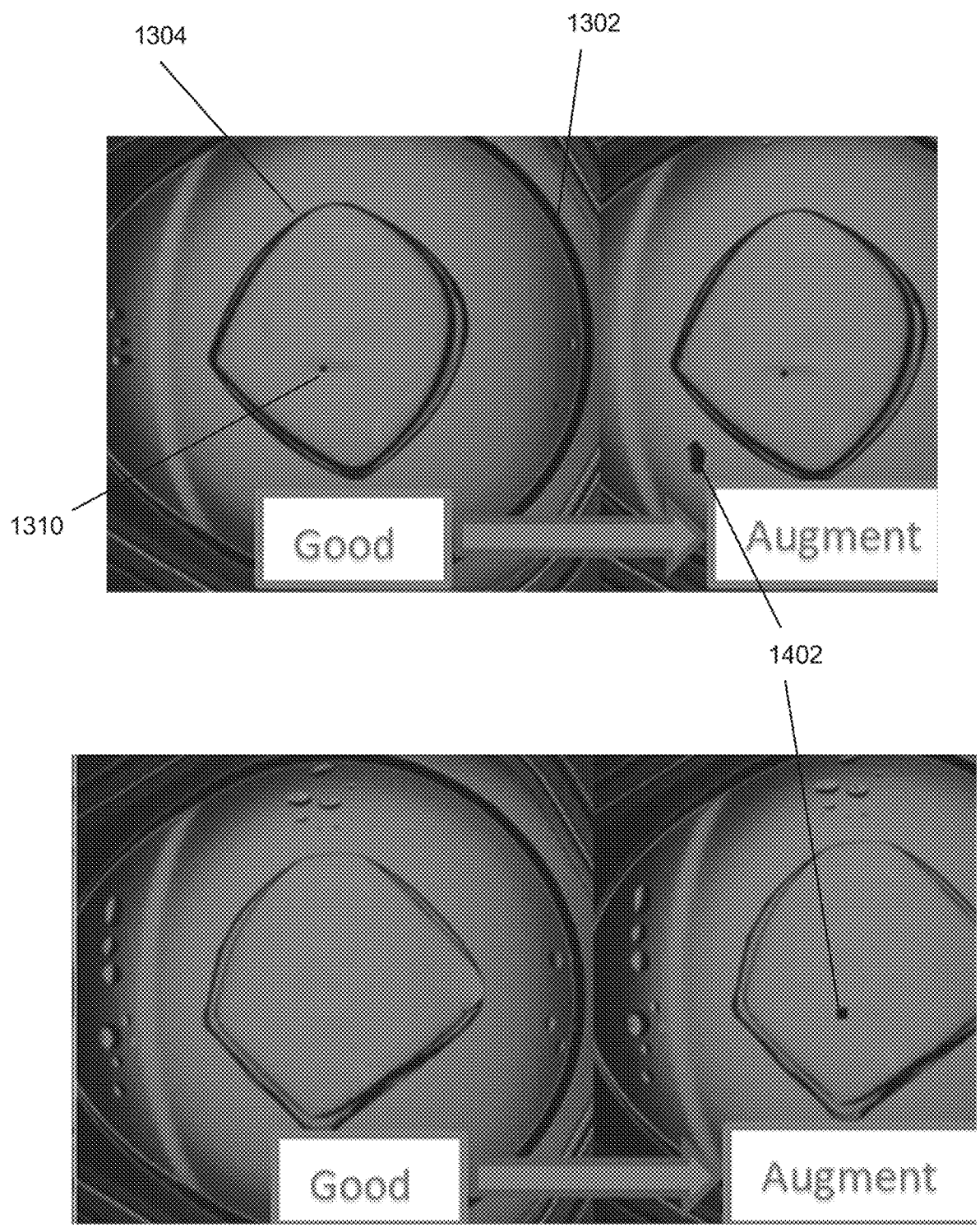
FIG. 15 illustrates augmenting an image with foreign matter.
Figure 16:
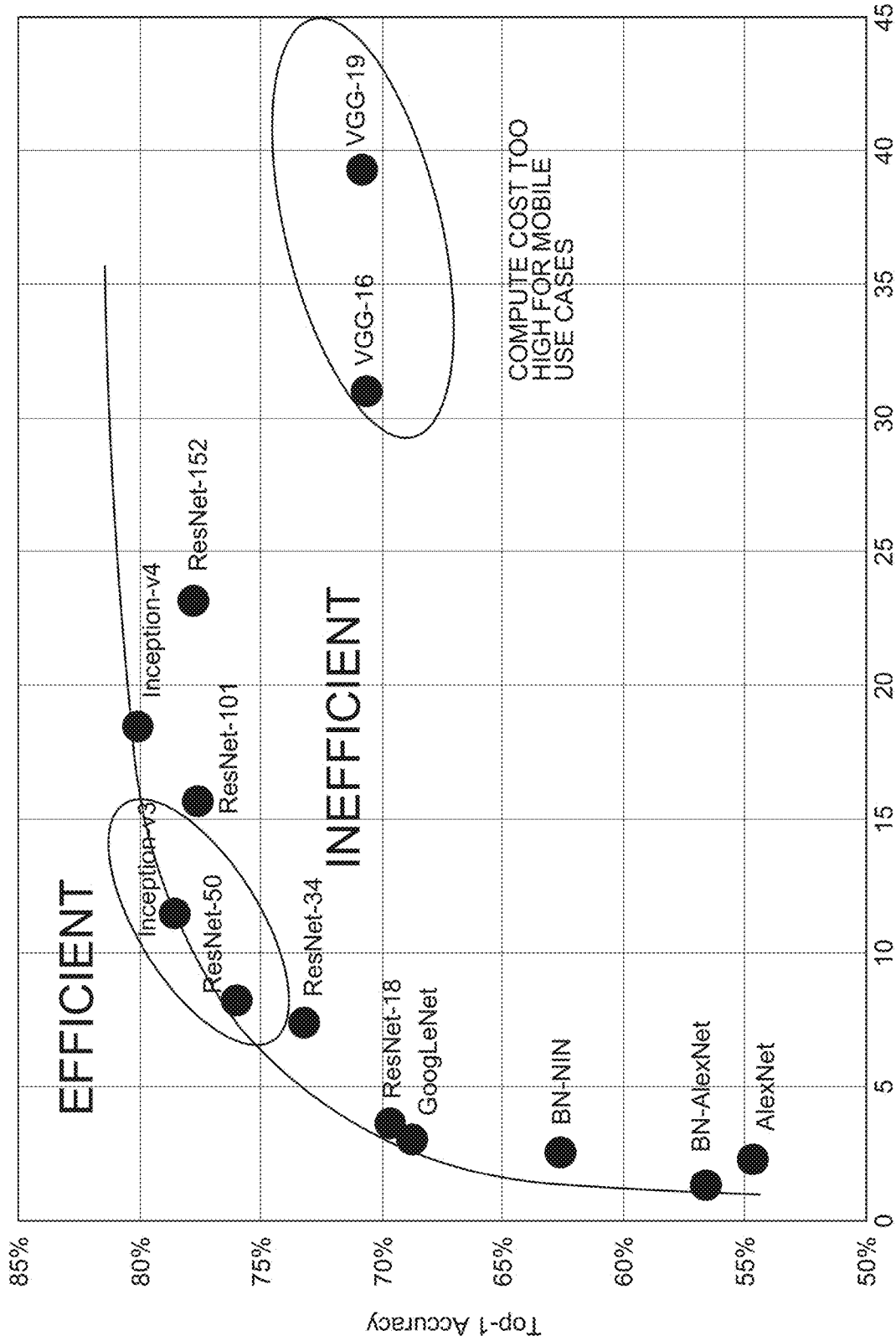
FIG. 16 illustrates CNN accuracy as an example function of calculating speed.

FIG. 14 and FIG. 15 further illustrate the creation of augmented data. An example of physical creation of FM in images was done to create training data by placing various types of FM in lens packages. For instance items such as excess lens material, plastic, and other small items were placed inside packages and fed into the processing stream. Images were taken of these FM-seeded items and manually identified as containing FM (see e.g., FIG. 13). A large number (e.g. 1000 or more) of such images were thereby obtained in one test to train the model (e.g. a CNN) to identify FM. Based on these known FM including images new, along with known images without FM, augmented images were created. These images are called augmented images (digitally augmented) or synthetic or in some cases hybrid images. A fully synthetic image—one created without using any known good or known bad image at all—may also be used for the purpose of creating a useful training data set. A hybrid image may take a known good image and copy a known FM portion of another image, and place the known FM portion into the image using standard editing tools from digital photography. Thus hybrid images may be created by merging portions of FM-free and FM-containing images. Another hybrid image may comprise taking a known good image and digitally adding synthetic FM to it. In FIG. 15 on the left hand side are two images labelled "Good" which contain no FM. They do contain a lens 1302 and some liquid 1304 to protect the lense. On the right hand side labelled "Augment" pixels were modified (e.g. digitally implanted) to create the appearance of foreign matter. Further examples are shown in FIG. 16. In addition, in FIG. 16, small foreign matter 1310 was already present in the original "good" image and remains in the augmented image. This small FM may not be large enough to trigger a rejection. Thus digital foreign matter 1402 has been added to these images. In addition it is possible to create hybrid or synthetic images FM of all shapes and sizes using these or related techniques. The images may be edited directly to create black portions similar in size and shape (or not) to known FM. This technique may also be described as digitally implanting FM into an image. It is much quicker and cheaper to create these augmented images of FM in a lens package than it is to create actual FM contaminated lens packages. The number of such images which can be created is also vastly greater. In one experimental training data set over 10,000 such FM-containing images were created and including in the training & testing data sets.

In the system or method, once the image has been acquired, pre-processing of the images may take place prior to analyzing the image with the model. Pre-processing of the image may comprise identifying the specific region of interest, enhancing contrast, adding or subtracting other images taken, and the like.

A convolutional neural network (CNN) may be designed or modified and implemented for identification of packages to be rejected. Packages may be sealed or unsealed and may contain a lens or may be empty. The packages may contain liquid or no liquid in addition to containing a lens or no lens. Multiple platforms exist for the creation of CNNs. One example platform is the Matlab package, though others exist, such as Octave & Python. An existing module be modified to slice original images to smaller sizes with only the regions of interest (ROIs) appropriately sized to feed into the CNN. These images were then defined by a region of interest (ROI) of, for instance 299 by 299 pixels (monochrome) defined by the packages themselves so that each ROI fed into the CNN has the appropriate number of pixels for processing. An exemplary CNN such as Inception V3 may comprise 48 total layers with a mixture of convolutional layers, max pooling layers and fully connected layers. In the later stages of the network a ReLU (rectifying linear unit) may be used as well as dropping a significant number of nodes in a randomized manner in order to avoid overfitting. A filter of size of, for instance, 3×3 may be used with a stride of 1, 2, or larger numbers. Layers may use a pad around the edge and corners of the image to enhance processing of the image. Similarly, the various layers of the network (e.g. convolutional layers, max pooling layers, softmax, dropout, fully connected layers, and the like) may be varied to achieve better results of identifying those packages with some defect while not mis-identifying those packages without a defect as defective or containing FM.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be or comprise a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method for quality control of contact lens packages, the method comprising:
   receiving a first data set comprising a plurality of images of a contact lens package having physically implanted foreign matter disposed therein;
   receiving a second data set comprising a plurality of images of a contact lens package having digitally implanted foreign matter;
   training one or more quality control models on at least a training subset of the first data and the second data, wherein the one or more quality control models are configured to detect the existence of foreign matter;
   testing the trained one or more quality control models on at least a validation subset of the first data and the second data;
   repeating the training and testing steps until the one or more quality control models meet a predetermined performance threshold and thereby constitute a validated one or more quality control models;

capturing image data of a package of a contact lens;

analyzing, based on the validated one or more quality control models, the image data; and causing, based on the analyzing, output of a quality control metric indicative of at least an accept or reject condition of the package.

2. The method of claim 1, wherein the one or more quality control models comprises a convolutional neural network having selected architecture to achieve the predetermined performance threshold.

3. The method of claim 1, wherein the one or more quality control models are configured to detect the existence of gross foreign matter having a size along at least one axis of greater than 640 microns.

4. The method of claim 1, wherein the second data set comprises images having a resolution of greater than 300×300 pixels or greater than 400×400 pixels or greater than 500×500 pixels or greater than 600×600 pixels or greater than 700×700 pixels or greater than 800×800 pixels or greater than 900×900 pixels or greater than 1000×1000 pixels.

5. The system of claim 4 comprising:
   a sensor configured for the capturing image data of a package of a contact lens;
   a computing device in communication with the sensor and configured to receive the image data and to effect one or more of:
      analyzing, based on the validated one or more quality control models, the image data; and
      causing, based on the analyzing, output of a quality control metric indicative of at least an accept or reject condition of the package.

6. The system of claim 5, further comprising a conveying mechanism configured to deliver the package of a contact lens within a field of view of the sensor.

7. A method for quality control of contact lens packages, the method comprising:
   receiving a first data set comprising a plurality of images of a contact lens package having physically implanted defects;
   receiving a second data set comprising a plurality of images of a contact lens package having digitally implanted defects;
   training one or more quality control models on at least a training subset of the first data and the second data, wherein the one or more quality control models are configured to detect the existence of defects;
   testing the trained one or more quality control models on at least a validation subset of the first data and the second data;
   repeating the training and testing steps until the one or more quality control models meet a predetermined performance threshold and thereby constitute a validated one or more quality control models;
   capturing image data of a package of a contact lens;
   analyzing, based on the validated one or more quality control models, the image data; and
   causing, based on the analyzing, output of a quality control metric indicative of at least an accept or reject condition of the package.

8. The method of claim 7, wherein the one or more of the physically implanted defects or the digitally implanted defects comprises one or more of foreign matter, an edge defect, or a hole.

9. The method of claim 7, wherein the one or more quality control models comprises a convolutional neural network having selected architecture to achieve the predetermined performance threshold.

10. The method of claim 7, wherein the one or more quality control models are configured to detect the existence of gross defects having a size along at least one axis of greater than 640 microns.

11. The method of claim 7, wherein the second data set comprises images having a resolution of greater than 300×300 pixels or greater than 400×400 pixels or greater than 500×500 pixels or greater than 600×600 pixels or greater than 700×700 pixels or greater than 800×800 pixels or greater than 900×900 pixels or greater than 1000×1000 pixels.

12. The system of claim 11 comprising:
   a sensor configured for the capturing image data of a package of a contact lens;
   a computing device in communication with the sensor and configured to receive the image data and to effect one or more of:
      analyzing, based on the validated one or more quality control models, the image data; and
      causing, based on the analyzing, output of a quality control metric indicative of at least an accept or reject condition of the package.

13. The system of claim 12, further comprising a conveying mechanism configured to deliver the package of a contact lens within a field of view of the sensor.

* * * * *